United States Patent
Song et al.

(10) Patent No.: US 8,437,515 B2
(45) Date of Patent: May 7, 2013

(54) FACE DETECTION APPARATUS AND FACE DETECTION METHOD

(75) Inventors: Kai-Tai Song, Hsinchu (TW); Meng-Ju Han, Taipei County (TW); Shih-Chieh Wang, Taipei (TW); Ming-Feng Chiang, Miaoli County (TW); Chia-Ho Lin, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 806 days.

(21) Appl. No.: 12/608,013

(22) Filed: Oct. 29, 2009

(65) Prior Publication Data

US 2010/0284619 A1   Nov. 11, 2010

(30) Foreign Application Priority Data

May 8, 2009 (TW) ................................ 98115254 A (51) Int. Cl.
*G06K 9/00* (2006.01)

(52) U.S. Cl.
USPC ........................................................... 382/118

(58) Field of Classification Search ............ 382/118, 382/209, 224, 288
See application file for complete search history.

(56) References Cited

U.S. PATENT DOCUMENTS

| | | | | |
|---|---|---|---|---|
| 7,099,510 B2 * | 8/2006 | Jones et al. | | 382/225 |
| 7,916,897 B2 * | 3/2011 | Corcoran et al. | | 382/103 |
| 7,974,446 B2 * | 7/2011 | Fujiwara | | 382/118 |
| 2008/0080744 A1 * | 4/2008 | Tanaka | | 382/118 |
| 2009/0226047 A1 * | 9/2009 | Yu et al. | | 382/118 |

OTHER PUBLICATIONS

Cristinacce "Automatic Detection of Facial Features in Grey Scale Images", university of Manchester, pp. 70-90, 2004.*

* cited by examiner

*Primary Examiner* — Daniel Mariam
(74) *Attorney, Agent, or Firm* — Rabin & Berdo, P.C.

(57) ABSTRACT

A face detection apparatus and a face detection method thereof are provided. The face detection apparatus includes a rectangle integral image unit, a feature mapping unit and a cascade and score unit. The rectangle integral image unit provides a rectangle integral image according to an original image. The feature mapping unit determines a face candidate region according to rectangular face feature templates, and calculates feature values of the rectangular face feature templates according to the rectangle integral image. The cascade and score unit judges whether the face candidate region conforms to cascade conditions or not, and gives the face candidate region a score according to the feature values when the face candidate region conforms to the cascade conditions. The face candidate region is a non-face region if the score of the face candidate region is lower than a threshold value.

18 Claims, 10 Drawing Sheets

|   |   |   |   |   |
|---|---|---|---|---|
| 5 | 4 | 1 | 2 | 5 |
| 3 | 2 | 5 | 3 | 0 |
| 2 | 3 | 5 | 1 | 1 |
| 2 | 2 | 3 | 1 | 2 |
| 4 | 3 | 4 | 0 | 1 |

FIG. 5

$RII(x_3,y_3)$   $RII(x_4,y_4)$   $RII$

|   |   |   |   |   |
|---|---|---|---|---|
| 5 | 9 | 10 | 12 | 17 |
| 8 | 14 | 20 | 25 | 30 |
| 10 | 19 | 30 | 36 | 42 |
| 12 | 23 | 37 | 44 | 52 |
| 16 | 30 | 48 | 55 | 64 |

$RII(x_5,y_5)$   $RII(x_6,y_6)$

| FV1 | 20%~40% | 20%~40% | 20%~40% | 20%~40% |
|---|---|---|---|---|
|  | 20 | 15 | 10 | 5 |
| FV2 | Difference after normalization and substation is smaller than 10 ||||
|  | 5 ||||
| FV3 | <5% || 5%~10% ||
|  | 10 || 5 ||
| FV4 | 20%~50% || 10%~20% | <10% |
|  | 30 || 20 | 10 |
| FV5 | 20%~50% || 10%~20% | <10% |
|  | 30 || 20 | 10 |
| FV6 | 10%~30% || 5%~10% | <5% |
|  | 15 || 10 | 5 |
| FV7 | 20%~50% || 10%~20% | <10% |
|  | 15 || 10 | 5 |
| FV8 | <5% ||||
|  | 5 ||||

| 80 | 105 | 105 | 105 | 95 | 90 | 85 | 80 |
| 55 | 50 | 55 | 95 | 95 | 85 | 75 | 60 |
| 45 | 70 | 80 | 90 | 90 | 80 | 75 | 70 |
| 95 | 95 | 95 | 85 | 85 | 95 | 95 | 95 |
| 100 | 100 | 100 | 90 | 90 | 100 | 100 | 100 |
| 100 | 90 | 80 | 75 | 75 | 80 | 90 | 100 |
| 95 | 85 | 75 | 65 | 65 | 75 | 85 | 95 |
| 85 | 90 | 95 | 85 | 85 | 95 | 90 | 85 |

FACE DETECTION APPARATUS AND FACE DETECTION METHOD

This application claims the benefit of Taiwan application Serial No. 98115254, filed May 8, 2009, the subject matter of which is incorporated herein by reference.

BACKGROUND OF THE INVENTION

1. Field of the Invention

The invention relates in general to a face detection apparatus and a face detection method thereof, and more particularly to a face detection apparatus with the reduced calculation loading and a face detection method thereof.

2. Description of the Related Art

In the conventional face detection technology, the skin detection is firstly applied to define a region which may contain the face. Then, the possible position of the face is detected by way of graphic comparison. However, the graphic comparison causes the significantly great calculation loading, and is thus not suitable for the application of a personal digital assistant (PDA), a digital camera or any other embedded system. Furthermore, the skin detection tends to be influenced by the light source so that the correctness of the face detection result is influenced.

SUMMARY OF THE INVENTION

The invention is directed to a face detection apparatus and a face detection method thereof, which include the following advantages.

First, the calculation loading is low, and the operation speed is greatly increased.

Second, the greater tolerance with respect to different light sources may be obtained.

Third, it is possible to effectively prevent the complicated background or noise from being generated during the image acquiring process.

According to a first aspect of the present invention, a face detection apparatus is provided. The face detection apparatus includes a rectangle integral image unit, a feature mapping unit and a cascade and score unit. The rectangle integral image unit provides a rectangle integral image according to an original image. The feature mapping unit determines a face candidate region according to a plurality of rectangular face feature templates, and calculates a plurality of feature values of the rectangular face feature templates according to the rectangle integral image. The cascade and score unit judges whether the face candidate region conforms to a plurality of cascade conditions, and gives the face candidate region a score according to the feature values when the face candidate region conforms to the cascade conditions. The face candidate region is a non-face region if the score of the face candidate region is lower than a threshold value.

According to a second aspect of the present invention, a face detection method is provided. The face detection method includes the steps of: providing a rectangle integral image according to an original image; determining a face candidate region according to a plurality of rectangular face feature templates; calculating a plurality of feature values of the rectangular face feature templates according to the rectangle integral image; judging whether the face candidate region conforms to a plurality of cascade conditions or not; giving the face candidate region a score according to the feature values when the face candidate region conforms to the cascade conditions; and determining the face candidate region as a non-face region if the score of the face candidate region is smaller than a threshold value.

The invention will become apparent from the following detailed description of the preferred but non-limiting embodiments. The following description is made with reference to the accompanying drawings.

DETAILED DESCRIPTION OF THE INVENTION

In order to improve the drawbacks that the conventional face detection technology has the great calculation loading and tends to be influenced by the light source, the following embodiment discloses a face detection apparatus and a face detection method thereof. The face detection apparatus includes a rectangle integral image (RII) unit, a feature mapping unit and a cascade and score unit. The rectangle integral image unit provides a rectangle integral image according to an original image. The feature mapping unit determines a face candidate region according to rectangular face feature templates, and calculates feature values of the rectangular face feature templates according to the rectangle integral image. The cascade and score unit judges whether the face candidate region conforms to cascade conditions, and gives the face candidate region a score according to the feature values when the face candidate region conforms to the cascade conditions. If the score of the face candidate region is lower than a threshold value, the face candidate region is a non-face region.

Figure 13:
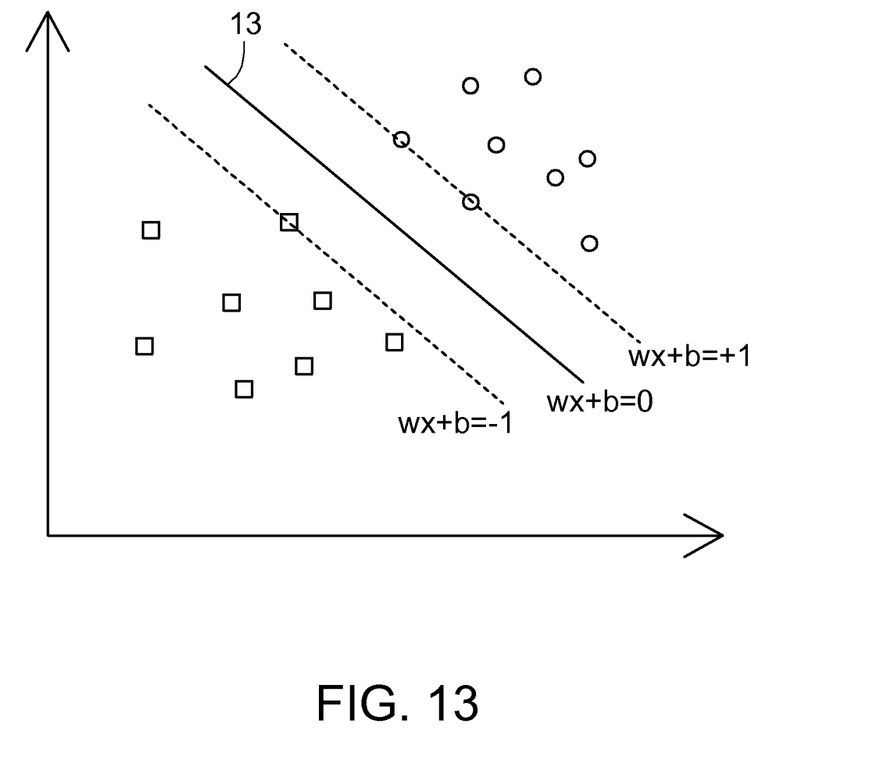
FIG. 13 is a schematic illustration showing a support vector machine (SVC).

FIG. 13 is a schematic illustration showing a support vector machine (SVM).

It is to be specified that if the rectangular face feature templates and the cascade conditions are sufficiently precise such that the face candidate region HFC may be judged as the face region or the non-face region, the subsequent processes performed by the block average unit 140, the classifier 150 and the face and non-face database 160 are no longer needed.

Figure 1:
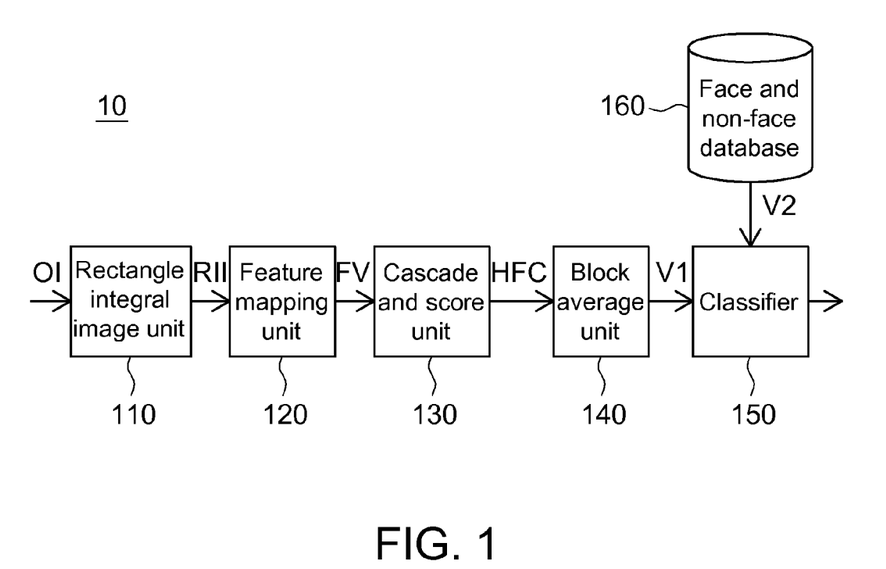
FIG. 1 is a schematic block diagram showing a face detection apparatus according to a first embodiment of the invention.

On the contrary, the face detection apparatus 10 may also adopt the block average unit 140, the classifier 150 and the face and non-face database 160 to perform the further subsequent processes to judge the face candidate region as the face region or the non-face region.

The block average unit 140 divides the face candidate region HFC into m×m equal portions, and calculates averages of the equal portions to output a feature vector V1. The face and non-face database 160 stores many face images and non-face images, and provides a feature vector V2 according to the face images and the non-face images. The classifier 150 determines whether the face candidate region HFC is the face region or not according to the feature vector V1 and the feature vector V2.

Figure 2:
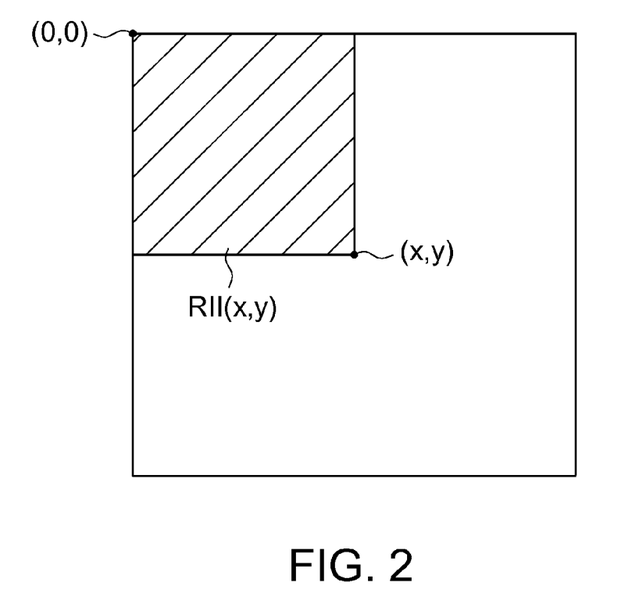
FIG. 2 is a schematic illustration showing a rectangle integral image at the coordinates (x,y).
Figure 3:
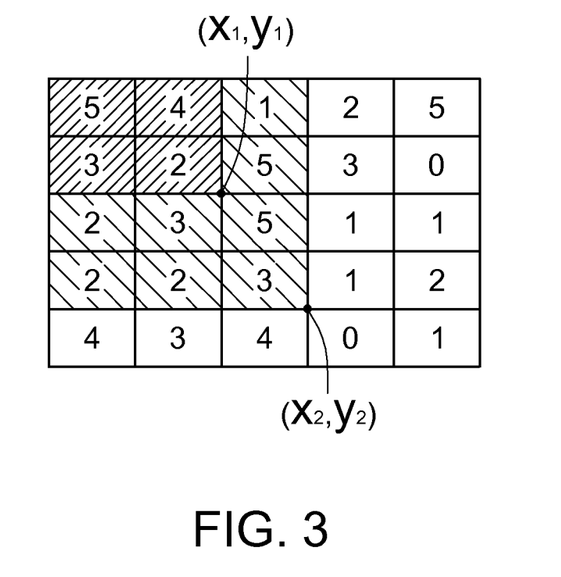
FIG. 3 is a schematic illustration showing gray values of an original image.
Figure 4:
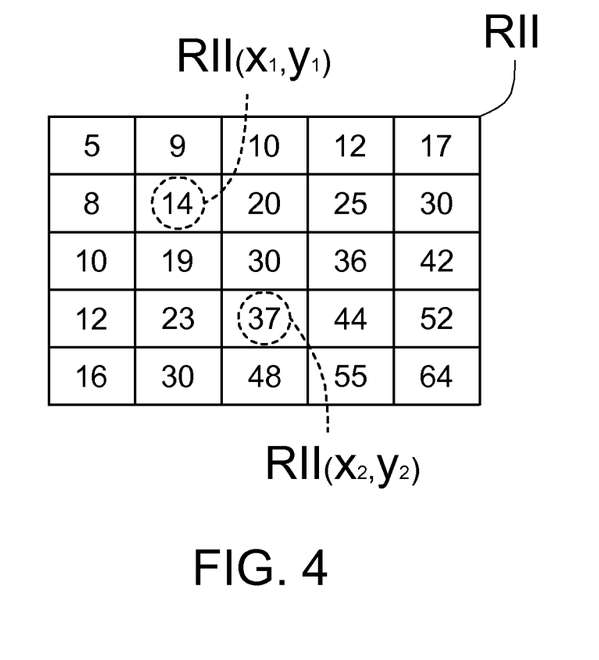
FIG. 4 is a schematic illustration showing the rectangle integral image of FIG. 3.

Please refer to FIGS. 1 to 4 simultaneously. FIG. 2 is a schematic illustration showing the rectangle integral image at the coordinates (x,y). FIG. 3 is a schematic illustration showing gray values of the original image. FIG. 4 is a schematic illustration showing the rectangle integral image of FIG. 3. The so-called rectangle integral image, as shown in FIG. 2, represents a sum RII(x,y) of gray values in a rectangular region defined by original coordinates (0,0) and the coordinates (x,y), and is defined as the following Equation (1).

$$RII(x, y) = \sum_{x' \leq x, y' \leq y} I(x', y') \quad (1)$$

It is assumed that the gray values of the original image OI are shown in FIG. 3. The rectangle integral image unit 110 provides the rectangle integral image RII shown in FIG. 4 according to the gray values of the original image OI after applying the Equation (1). For example, the sum of the gray values in the rectangular region defined by the original coordinates (0,0) and the coordinates (x1,y1) is equal to RII(x1, y1)=5+4+3+2=14, as shown in FIG. 4. In addition, the sum of the gray values in the rectangular region defined by the original coordinates (0,0) and the coordinates (x2,y2) is equal to RII(x2,y2)=5+4+3+2+1+5+2+3+5+2+2+3=37, as shown in FIG. 4.

Figure 5:
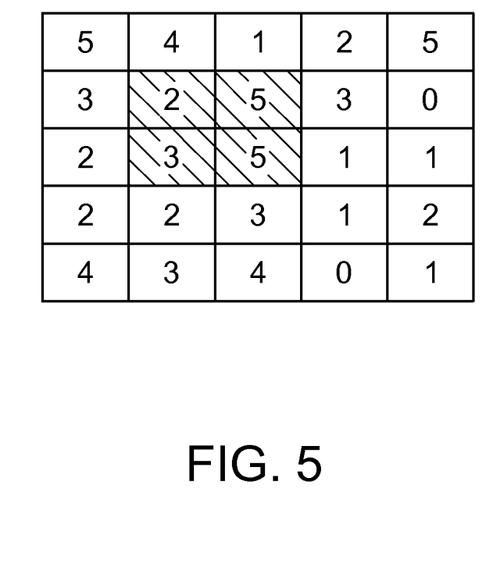
FIG. 5 is a schematic illustration showing gray values of the original image.
Figure 6:
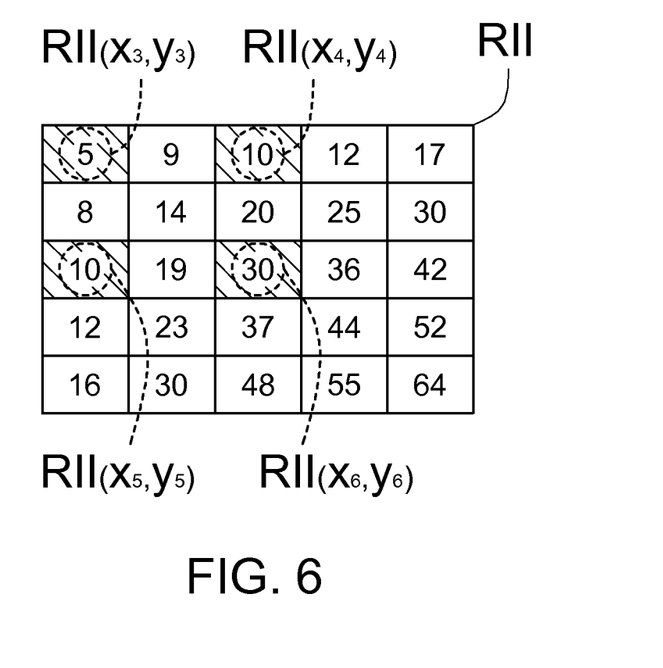
FIG. 6 is a schematic illustration showing a rectangle integral image of FIG. 5.

Please refer to FIGS. 1, 5 and 6. FIG. 5 is a schematic illustration showing the gray values of the original image. FIG. 6 is a schematic illustration showing the rectangle integral image of FIG. 5. According to the rectangle integral image RII provided by the rectangle integral image unit 110, only one addition and two subtractions are needed when an arbitrary rectangular region in the frame needs to be calculated subsequently. For example, when the rectangle integral image unit 110 calculates the sum of the gray values in a rectangular region 510, it does not summate pixels in the rectangular region 510 one by one, but performs the operation of: RII(x6,y6)+RII(x3,y3)−RII(x4,y4)−RII(x5,y5)=30+5−10−10=15. Because the rectangle integral image unit 110 does not summate the pixels in the rectangular region 510 one by one, the calculation loading can be greatly reduced, and is particularly suitable for the embedded hardware without the powerful calculation ability.

Figure 7A:
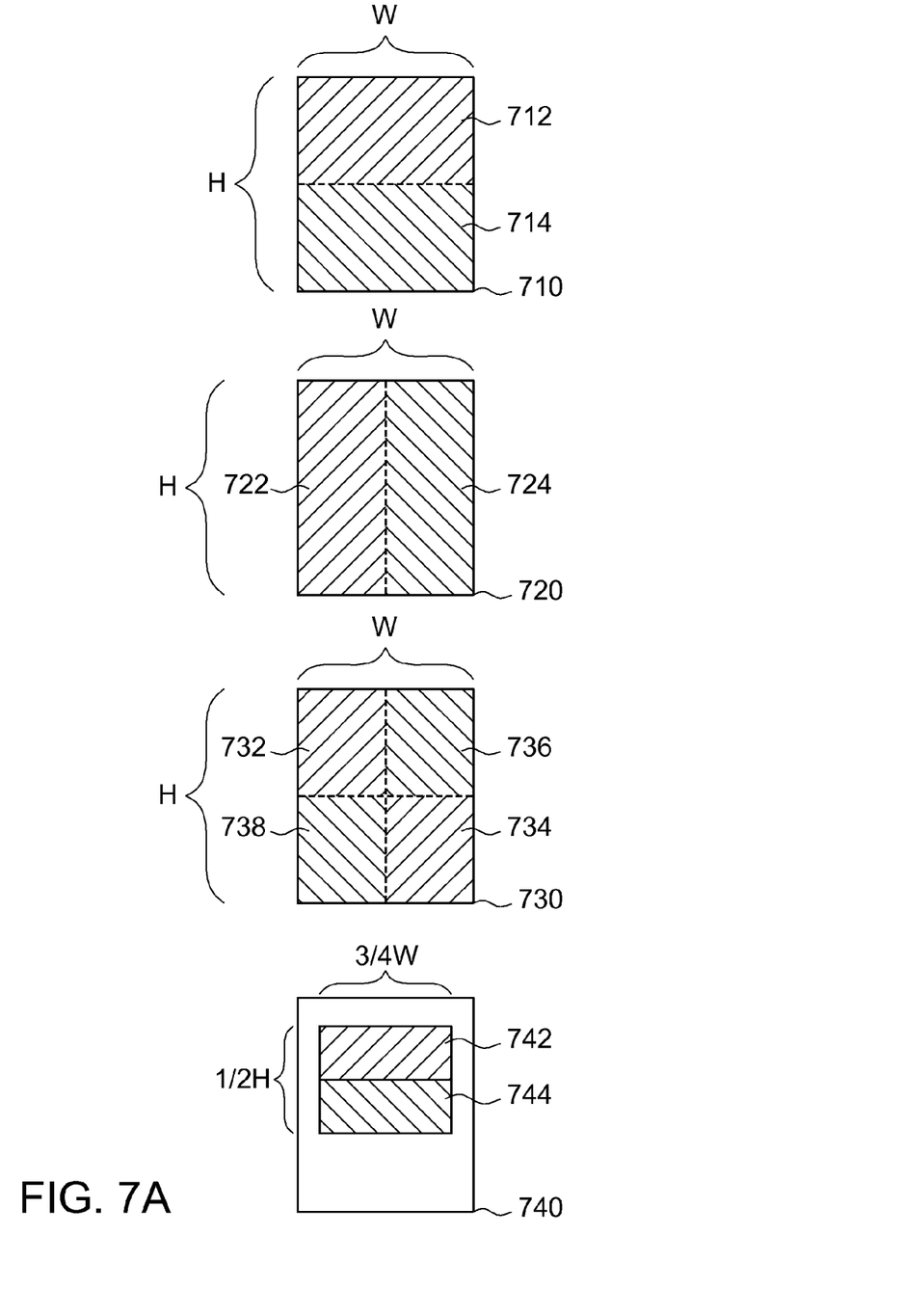
FIGS. 7A and 7B are schematic illustrations showing rectangular face feature templates.
Figure 7B:
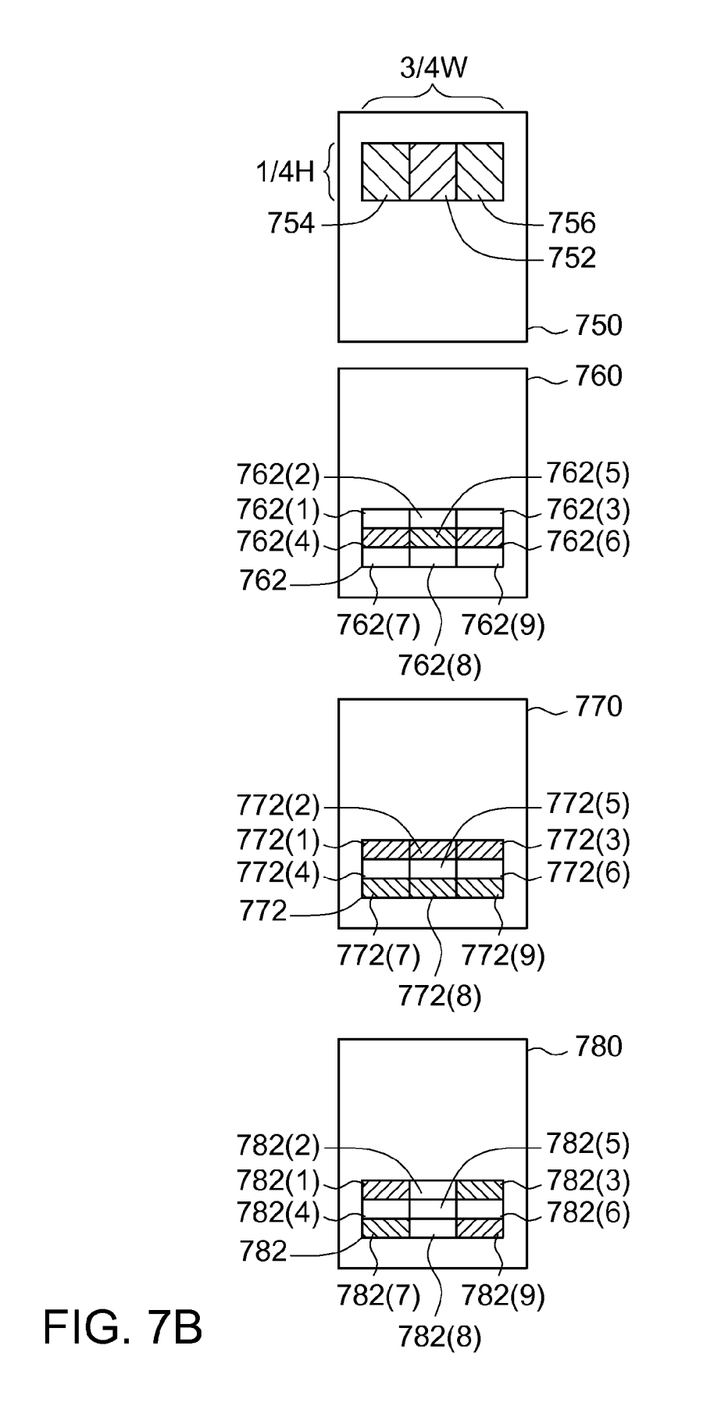

Please refer to FIGS. 1, 7A and 7B simultaneously. FIGS. 7A and 7B are schematic illustrations showing the rectangular face feature templates. The feature mapping unit 120 determines the face candidate region according to the rectangular face feature templates, and calculates the feature values FV of the rectangular face feature templates according to the rectangle integral image RII. The rectangular face feature templates may be determined according to the actual application, and the number of the rectangular face feature templates may be correspondingly adjusted according to the requirement. For example, the rectangular face feature templates include a rectangular face feature template 710, rectangular face feature templates 720 and 730, a rectangular face feature template 740, a rectangular face feature template 750, a rectangular face feature template 760, a rectangular face feature template 770 and a rectangular face feature template 780, as shown in FIGS. 7A and 7B. The feature values FV corresponding to the rectangular face feature templates 710, 720, 730, 740, 750, 760, 770 and 780 are FV1, FV2, FV3, FV4, FV5, FV6, FV7 and FV8, respectively.

Because the aspect ratio of the face is about 1.2:1, the ratio of the height H to the width W in each of the rectangular face feature templates 710 to 780 is preferably set as H:W=1.2:1. The rectangular face feature template 710 includes an upper half region 712 and a lower half region 714 respectively having an upper area and a lower area, which are substantially the same. The rectangular face feature template 710 defines that a sum of gray values of the upper half region 712 is smaller than a sum of gray values of the lower half region 714. If the sum of gray values of the upper half region 712 is equal to j and the sum of gray values of the lower half region 714 is equal to k, then the feature value FV1 of the rectangular face feature template 710 is equal to $$\frac{j-k}{j}.$$

The rectangular face feature template 720 includes a left half region 722 and a right half region 724 respectively having a left area and a right area, which are substantially the same. The rectangular face feature template 720 defines that a sum of gray values of the left half region 722 is substantially equal to a sum of gray values of the right half region 724. If the sum of the gray values of the left half region 722 is equal to p and the sum of the gray values of the right half region 724 is equal to q, then the feature value FV2 of the rectangular face feature template 720 is equal to $$\frac{p-q}{p}.$$

The rectangular face feature template 730 includes an upper left region 732, a lower right region 734, an upper right region 736 and a lower left region 738. The lower right region 734 and the upper left region 732 are skew symmetric, and the lower left region 738 and the upper right region 736 are skew symmetric. The rectangular face feature template 730 defines that a sum of gray values of the upper left region 732 and the lower right region 734 is substantially equal to a sum of gray values of the upper right region 736 and the lower left region 738. If the sum of the gray values of the upper left region 732 and the lower right region 734 is equal to r and the sum of the gray values of the upper right region 736 and the lower left region 738 is equal to s, then the feature value FV3 of the rectangular face feature template 730 is equal to $$\frac{r-s}{r}.$$

The rectangular face feature template 740 includes an eye region 742 and an under-eye region 744. A width of the eye region 742 is equal to a width of the under-eye region 744 and equal to $$\frac{3}{4}W,$$

and a sum of lengths of the eye region 742 and the under-eye region 744 is equal to $$\frac{1}{2}H.$$

The rectangular face feature template 740 defines that a sum of gray values of the eye region 742 is smaller than a sum of gray values of the under-eye region 744. If the sum of the gray values of the eye region 742 is equal to t and the sum of the gray values of the under-eye region 744 is equal to u, then the feature value FV4 of the rectangular face feature template 740 is equal to $$\frac{t-u}{t}.$$

The rectangular face feature template 750 includes a brow region 752, an eyebrow region 754 and an eyebrow region 756. A sum of widths of the brow region 752, the eyebrow region 754 and the eyebrow region 756 is equal to $$\frac{3}{4}W,$$

and a length of the brow region 752 is equal to a length of the eyebrow region 754, a length of the eyebrow region 756, and $$\frac{1}{4}H.$$

The rectangular face feature template 750 defines that a sum of gray values of the brow region 752 is greater than one half of a sum of gray values of the eyebrow region 754 and the eyebrow region 756. The rectangular face feature template 750 defines that a sum of the gray values of the brow region 752 is greater than a sum of gray values of the two regions 754 on two sides of the brow. If the sum of the gray values of the brow region 752 is equal to v, the sum of gray values of the eyebrow region 754 is equal to w and the sum of gray values of the eyebrow region 756 is equal to z, then the feature value FV5 of the rectangular face feature template 750 is equal to $$\frac{v - \frac{(w+z)}{2}}{v}.$$

The rectangular face feature template 760 includes a mouth region 762, which includes a mouth upper-left corner region 762(1), a mouth right-above region 762(2), a mouth upper-right corner region 762(3), a mouth corner region 762(4), a mouth center region 762(5), a mouth corner region 762(6), a mouth lower-left corner region 762(7), a mouth right-below region 762(8) and a mouth lower right region 762(9). The rectangular face feature template 760 defines that a sum of gray values of the mouth center region 762(5) is greater than one half of a sum of gray values of the mouth corner region 762(4) and the mouth corner region 762(6). If the sum of the gray values of the mouth center region 762(5) is equal to e, the sum of gray values of the mouth corner region 762(4) is equal to f and the sum of gray values of the mouth corner region 762(3) is equal to g, then the feature value FV6 of the rectangular face feature template 760 is equal to $$\frac{e - \frac{(f+g)}{2}}{e}.$$

The rectangular face feature template 770 includes a mouth region 772, which includes a mouth upper-left corner region 772(1), a mouth right-above region 772(2), a mouth upper-right corner region 772(3), a mouth corner region 772(4), a mouth center region 772(5), a mouth corner region 772(6), a mouth lower-left corner region 772(7), a mouth right-below region 772(8) and a mouth lower right region 772(9). The mouth upper-left corner region 772(1), the mouth right-above region 772(2) and the mouth upper-right corner region 772(3) pertain to the mouth top region. The mouth corner region 772(4), the mouth center region 772(5) and the mouth corner region 772(6) pertain to the mouth middle region. The mouth lower-left corner region 772(7), the mouth right-below region 772(8) and the mouth lower right region 772(9) pertain to the mouth bottom region. The rectangular face feature template 770 defines that a sum of gray values of the mouth top region is greater than a sum of gray values of the mouth bottom region. If the sum of gray values of the mouth upper-left corner region 772(1) is equal to a, the sum of gray values of the mouth right-above region 772(2) is equal to b, the sum of gray values of the mouth upper-right corner region 772(3) is equal to c, the sum of gray values of the mouth corner region 772(4) is equal to d, the sum of gray values of the mouth center region 772(5) is equal to e, the sum of gray values of the mouth corner region 772(6) is equal to f, the sum of gray values of the mouth lower-left corner region 772(7) is equal to g, the sum of gray values of the mouth right-below region 772(8) is equal to h and the sum of gray values of the mouth lower right region 772(9) is equal to i, then the feature value FV7 of the rectangular face feature template 770 is equal to $$\frac{(a+b+c) - \min\{(d+e+f), (g+h+i)\}}{(a+b+c)}.$$

The rectangular face feature template 780 includes a mouth region 782, which includes a mouth upper-left corner region 782(1), a mouth right-above region 782(2), a mouth upper-right corner region 782(3), a mouth corner region 782(4), a mouth center region 782(5), a mouth corner region 782(6), a mouth lower-left corner region 782(7), a mouth right-below region 782(8) and a mouth lower-right corner region 782(9). The mouth lower-right corner region 782(9) and the mouth upper-left corner region 782(1) are skew symmetric. The mouth lower-left corner region 782(7) and the mouth upper-right corner region 782(3) are skew symmetric. The rectangular face feature template 780 defines that a sum of gray values of the mouth upper-left corner region 782(1) and the mouth lower-right corner region 782(9) is substantially equal to a sum of gray values of the mouth upper-right corner region 782(3) and the mouth lower-left corner region 782(7). If the sum of gray values of the mouth upper-left corner region 782(1) is equal to a, the sum of gray values of the mouth lower-right corner region 782(9) is equal to i, the sum of gray values of the mouth upper-right corner region 782(3) is equal to c, and the sum of gray values of the mouth lower-left corner region 782(7) is equal to g, then the feature value FV8 of the rectangular face feature template 770 is equal to $$\frac{(a+i)-(g+c)}{(a+i)}.$$

Figure 8:
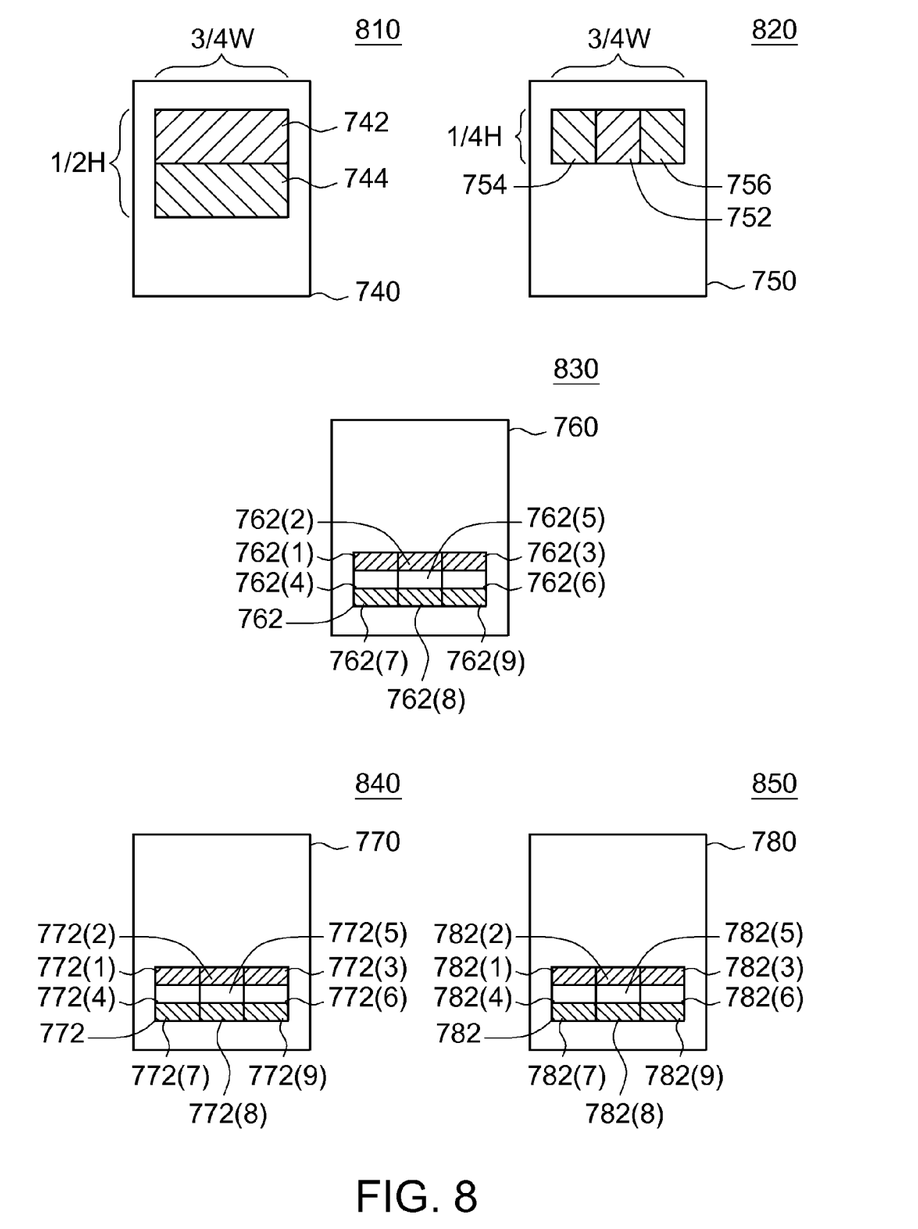
FIG. 8 is a schematic illustration showing cascade conditions.

Please refer to FIGS. 1 and 8 simultaneously. FIG. 8 is a schematic illustration showing the cascade conditions. The cascade and score unit 130 judges whether the face candidate region HFC conforms to the cascade conditions or not. That is, the cascade and score unit 130 judges whether a portion of the feature values FV conforms to the cascade conditions or not. The cascade conditions may be determined according to the practical application, and the number of the cascade conditions may also be correspondingly adjusted according to the requirement. For example, the cascade conditions include a cascade condition 810, a cascade condition 820, a cascade condition 830, a cascade condition 840 and a cascade condition 850, as shown in FIG. 8.

The cascade condition 810 defines that the feature value FV4 of the rectangular face feature template 740 is greater than or equal to 10%. That is, $$FV4 = \frac{t-u}{t} \geq 10\%.$$

The cascade condition 820 defines that the feature value FV5 of the rectangular face feature template 750 is greater than or equal to 10%. That is, $$FV5 = \frac{v - \frac{(w+z)}{2}}{v} \geq 10\%.$$

The cascade condition 830 defines that the feature value FV6 of the rectangular face feature template 760 is greater than or equal to 5%. That is, $$FV6 = \frac{e - \frac{(f+g)}{2}}{e} \geq 5\%.$$

The cascade condition 840 defines that the feature value FV7 of the rectangular face feature template 770 is greater than or equal to 100%. That is, $$FV7 = \frac{(a+b+c) - \min\{(d+e+f), (g+h+i)\}}{(a+b+c)} \geq 100\%.$$

The cascade condition 850 defines that the feature value FV8 of the rectangular face feature template 780 is smaller than or equal to 5%. That is, $$FV8 = \frac{|(a+i)-(g+c)|}{(a+i)} \leq 5\%.$$

The cascade and score unit 130 sequentially judges whether the feature value FV4, the feature value FV5, the feature value FV6, the feature value FV7 and the feature value FV8 conform to the cascade condition 810, the cascade condition 820, the cascade condition 830, the cascade condition 840 and the cascade condition 850 or not. When the feature value FV4 conforms to the cascade condition 810, the cascade and score unit 130 further judges whether the feature value FV5 conforms to the cascade condition 820 or not. When the feature value FV5 conforms to the cascade condition 820, the cascade and score unit 130 further judges whether the feature value FV6 conforms to the cascade condition 830 or not. Thereafter, when the feature value FV6 conforms to the cascade condition 830, the cascade and score unit 130 further judges whether the feature value FV7 conforms to the cascade condition 840 or not. Finally, when the feature value FV7 conforms to the cascade condition 840, the cascade and score unit 130 further judges whether the feature value FV8 conforms to the cascade condition 850. If any one of the cascade condition 810, the cascade condition 820, the cascade condition 830, the cascade condition 840 and the cascade condition 850 does not occur, then the cascade and score unit 130 judges the face candidate region FHC as the non-face region.

Figure 9:
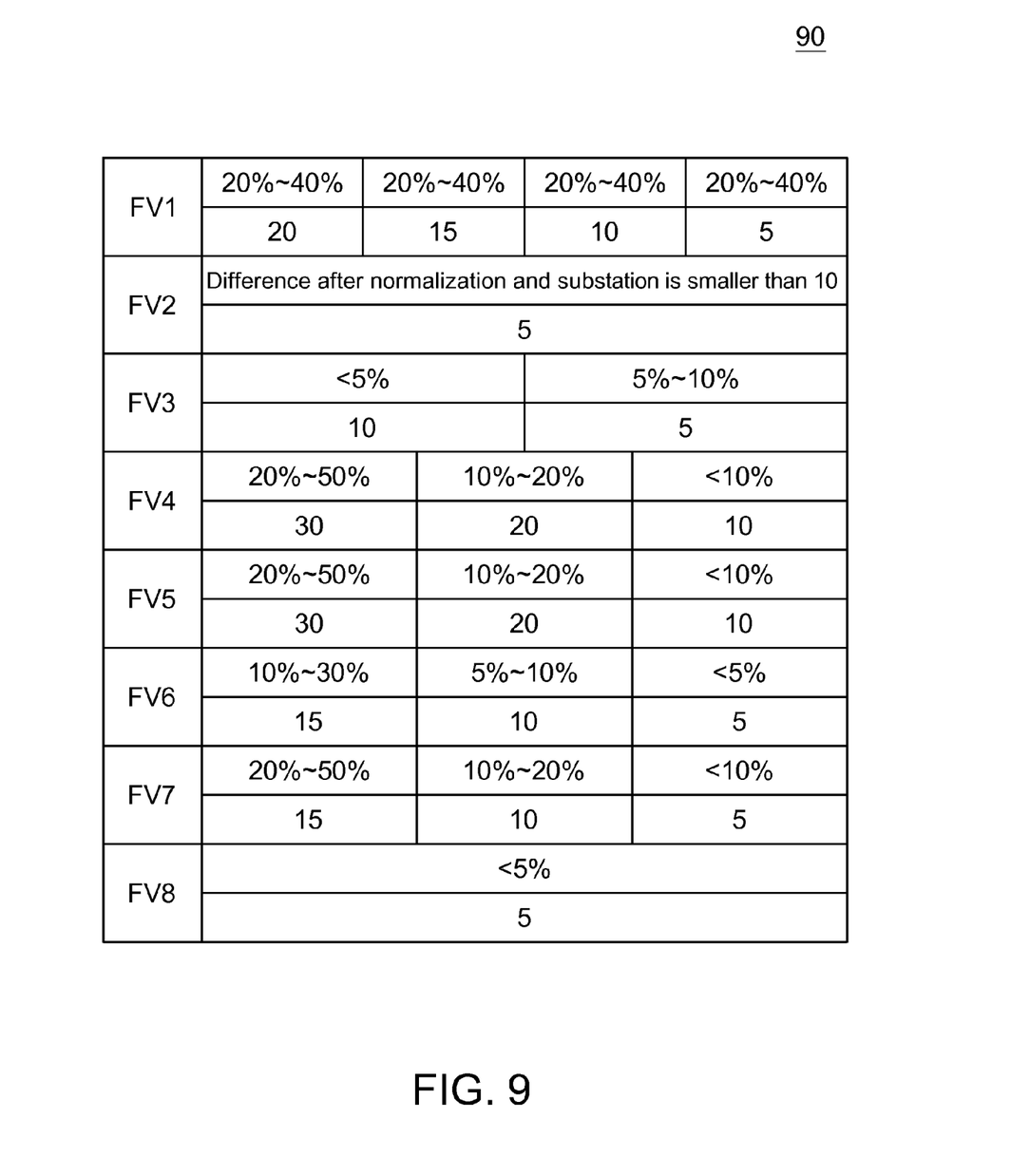
FIG. 9 is a schematic illustration showing a score table.

Please refer to FIGS. 1 and 9 simultaneously. FIG. 9 is a schematic illustration showing a score table 90. The cascade and score unit 130 gives the face candidate region FHC a score according to the score table 90 and the feature values FV. The score table 90 may be flexibly adjusted according to the practical application. Because on original image OI may contain multiple face candidate regions FHC, the cascade and score unit 130 may screen out the face candidate region FHC with the higher score from the face candidate regions FHC. For example, the threshold value is 60. If the score of the face candidate region FHC is lower than 60, the face candidate region FHC is the non-face region.

Figure 10:
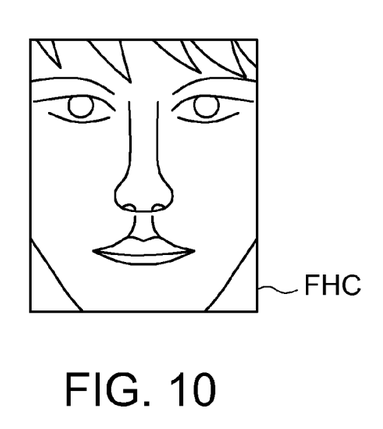
FIG. 10 is a schematic illustration showing a face candidate region.
Figure 11:
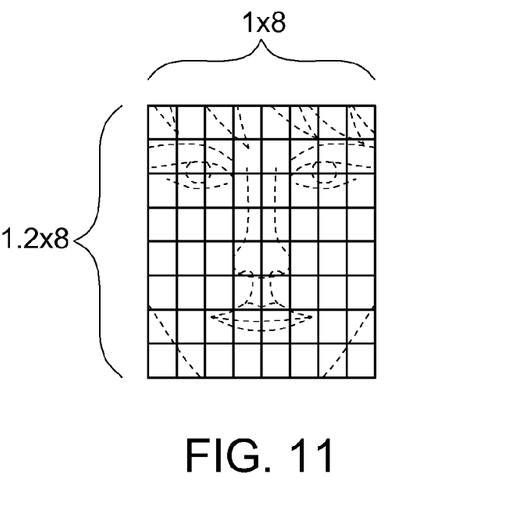
FIG. 11 is a schematic illustration showing that the face candidate region is divided into 64 equal portions.
Figure 12:
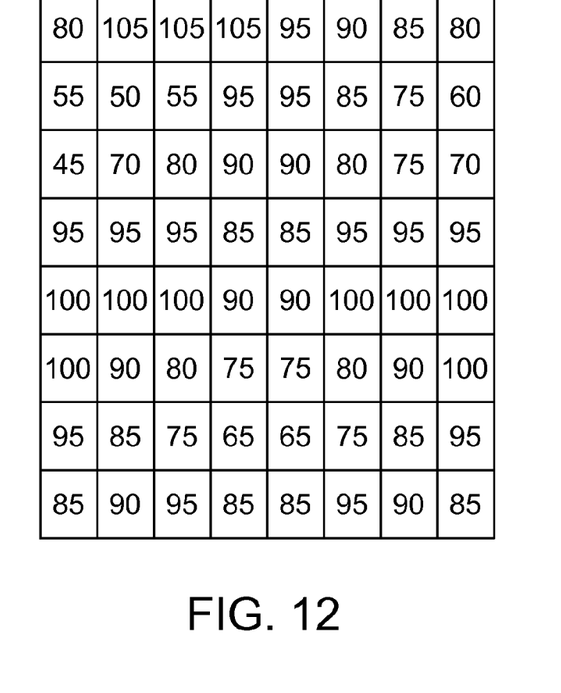
FIG. 12 is a schematic illustration showing averages of gray values of the 64 equal portions.

Please refer to FIGS. 1, 10, 11 and 12 simultaneously. FIG. 10 is a schematic illustration showing the face candidate region. FIG. 11 is a schematic illustration showing that the face candidate region is divided into 64 equal portions. FIG. 12 is a schematic illustration showing averages of the gray values of the 64 equal portions. The block average unit 140 divides the face candidate region HFC of FIG. 10 into 8×8 equal portions shown in FIG. 11. The block average unit 140 calculates the average of the gray values in each of the 64 equal portions, as shown in FIG. 12. The block average unit 140 obtains a 64-dimensional feature vector V1 according to the averages of the gray values of the 64 equal portions.

Please refer to FIGS. 1 and 13 simultaneously. FIG. 13 is a schematic illustration showing a support vector machine (SVC). The classifier 150 is implemented by, for example, the support vector machine (SVC), a principal component analysis (PCA) or an eigenface. For the sake of illustration, the classifier 150 of this embodiment is the support vector machine. In the problem of distinguishing between two types, the support vector machine can find a separating hyperplane 13 between the two types such that the same type of samples pertain to one side of the separating hyperplane 13.

The face and non-face database 160 stores multiple face images and multiple non-face images, and provides the feature vector V2 according to the face images and the non-face images. The classifier 150 determines whether the face candidate region HFC is the face region or not according to the feature vector V1 and the feature vector V2.

Figure 14:
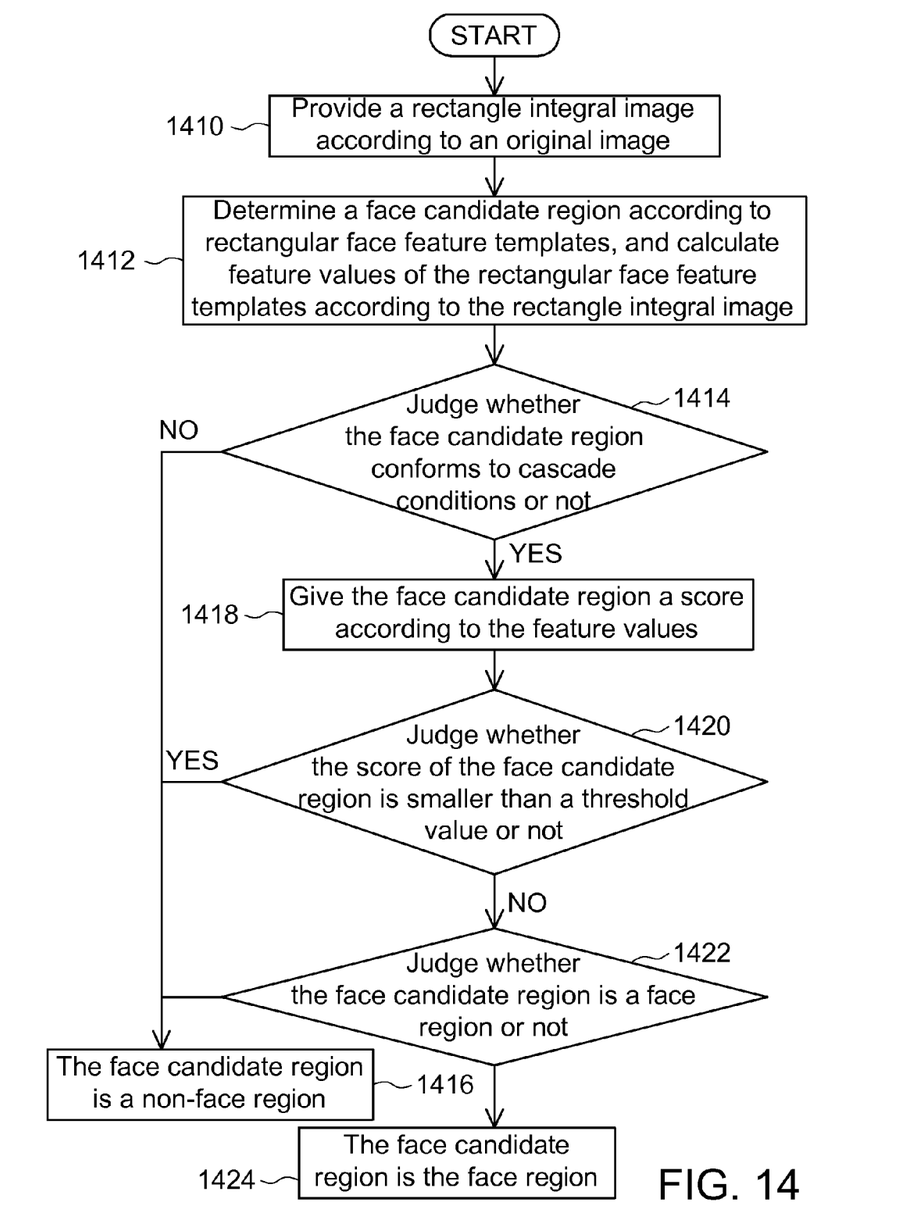
FIG. 14 is a flow chart showing a face detection method according to the embodiment of the invention.

Please refer to FIGS. 1 and 14 simultaneously. FIG. 14 is a flow chart showing a face detection method according to the embodiment of the invention. First, as shown in step 1410, the rectangle integral image unit 110 provides the rectangle integral image RII according to the original image OI. Next, as shown in step 1412, the feature mapping unit 120 determines the face candidate region FHC according to the rectangular face feature templates, and calculates the feature values FV of the rectangular face feature templates according to the rectangle integral image RII. Then, as shown in step 1414, the cascade and score unit 130 judges whether the face candidate region FHC conforms to the cascade conditions or not. If the face candidate region FHC does not conform to the cascade conditions, then the face candidate region FHC is judged as the non-face region, as shown in step 1416. Oppositely, if the face candidate region FHC conforms to the cascade conditions, then the cascade and score unit 130 gives the face candidate region FHC a score, as shown in step 1418. Next, as shown in step 1420, the cascade and score unit 130 judges whether the score of the face candidate region FHC is lower than the threshold value or not. If the score of the face candidate region FHC is lower than the threshold value, then the face candidate region FHC is judged as the non-face region, as shown in step 1416. Oppositely, if the score of the face candidate region FHC is not lower than the threshold value, then the classifier 150 judges whether the face candidate region FHC is the face region according to the feature vector V1 and the feature vector V2, as shown in step 1422.

Please refer to FIGS. 1 and 13 simultaneously. FIG. 13 is a schematic illustration showing a support vector machine (SVM). The classifier 150 is implemented by, for example, the support vector machine (SVM), a principal component analysis (PCA) or an eigenface. For the sake of illustration, the classifier 150 of this embodiment is the support vector machine. In the problem of distinguishing between two types, the support vector machine can find a separating hyperplane 13 between the two types such that the same type of samples pertain to one side of the separating hyperplane 13.

First, the calculation loading is low, and the operation speed is greatly increased.

Second, the greater tolerance with respect to different light sources may be obtained.

Third, it is possible to effectively prevent the complicated background or noise from being generated during the image acquiring process.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A face detection apparatus, comprising:
 a rectangle integral image (RII) unit for providing a rectangle integral image according to an original image;
 a feature mapping unit for determining a face candidate region according to a plurality of rectangular face feature templates, and calculating a plurality of feature values of the rectangular face feature templates according to the rectangle integral image;
 a cascade and score unit for judging whether the face candidate region conforms to a plurality of cascade conditions, and giving the face candidate region a score according to the feature values when the face candidate region conforms to the cascade conditions, wherein the face candidate region is a non-face region if the score of the face candidate region is lower than a threshold value; and
 a block average unit for dividing the face candidate region into a plurality of equal portions, and calculating an average of each of the equal portions to output a first feature vector.

2. The apparatus according to claim 1, further comprising:
 a face and non-face database for storing a plurality of face images and a plurality of non-face images and providing a second feature vector according to the face images and the non-face images; and
 a classifier for determining whether the face candidate region is a face region or not according to the first feature vector and the second feature vector.

3. The apparatus according to claim 1, wherein an aspect ratio of the rectangular face feature templates is 1.2:1.

4. The apparatus according to claim 1, wherein the rectangular face feature templates comprise:
 a first rectangular face feature template, which comprises:
 an upper half region; and
 a lower half region, wherein a sum of gray values of the upper half region is smaller than a sum of gray values of the lower half region;
 a second rectangular face feature template, which comprises:
 a left half region; and
 a right half region, wherein a sum of gray values of the left half region is substantially equal to a sum of gray values of the right half region; and
 a third rectangular face feature template, which comprises:
 an upper left region;
 a lower right region, wherein the lower right region and the upper left region are skew symmetric;
 an upper right region; and
 a lower left region, wherein the lower left region and the upper right region are skew symmetric, a sum of gray values of the upper left region and the lower right region is substantially equal to a sum of gray values of the upper right region and the lower left region.

5. The apparatus according to claim 4, wherein the rectangular face feature templates comprise:
 a fourth rectangular face feature template, which comprises:
 an eye region; and
 an under-eye region, wherein a sum of gray values of the eye region is smaller than a sum of gray values of the under-eye region; and
 a fifth rectangular face feature template, which comprises:
 a brow region;
 a first eyebrow region; and
 a second eyebrow region, wherein a sum of gray values of the brow region is greater than one half of a sum of gray values of the first eyebrow region and the second eyebrow region.

6. The apparatus according to claim 5, wherein a width of the eye region is equal to a width of the under-eye region and equal to three fourths of a width of the fourth rectangular face feature template, and a sum of lengths of the eye region and the under-eye region is equal to one half of a length of the fourth rectangular face feature template.

7. The apparatus according to claim 5, wherein a sum of widths of the first eyebrow region and the second eyebrow region is equal to three fourths of a width of the fifth rectangular face feature template, and a length of the brow region is equal to a length of the first eyebrow region, equal to a length of the second eyebrow region and equal to one fourth of a length of the fifth rectangular face feature template.

8. The apparatus according to claim 5, wherein the rectangular face feature templates comprise:
 a sixth rectangular face feature template, which comprises:
 a mouth region, which comprises:
 a mouth center region;

a first mouth corner region; and
a second mouth corner region, wherein a sum of gray values of the mouth center region is greater than one half of a sum of gray values of the first mouth corner region and the second mouth corner region;
a seventh rectangular face feature template, which comprises:
a mouth region, which comprises:
a mouth top region;
a mouth bottom region, wherein a sum of gray values of the mouth top region is greater than a sum of gray values of the mouth bottom region; and
a mouth middle region disposed between the mouth top region and the mouth bottom region;
an eighth rectangular face feature template, which comprises:
a mouth region, which comprises:
a mouth upper-left corner region;
a mouth lower-right corner region, wherein the mouth lower-right corner region and the mouth upper-left corner region are skew symmetric;
a mouth upper-right corner region; and
a mouth lower-left corner region, wherein the mouth lower-left corner region and the mouth upper-right corner region are skew symmetric, and a sum of gray values of the mouth upper-left corner region and the mouth lower-right corner region is substantially equal to a sum of gray values of the mouth upper-right corner region and the mouth lower-left corner region.

9. The apparatus according to claim 1, wherein the cascade and score unit judges whether a portion of the feature values conforms to the plurality of cascade conditions or not.

10. A face detection method, comprising the steps of:
providing a rectangle integral image according to an original image;
determining a face candidate region according to a plurality of rectangular face feature templates;
calculating a plurality of feature values of the rectangular face feature templates according to the rectangle integral image;
judging whether the face candidate region conforms to a plurality of cascade conditions or not;
giving the face candidate region a score according to the feature values when the face candidate region conforms to the cascade conditions;
determining the face candidate region as a non-face region if the score of the face candidate region is smaller than a threshold value; dividing the face candidate region into a plurality of equal portions;
calculating an average of each of the equal portions; and
outputting a first feature vector according to the averages of the equal portions;
wherein the face detection method is performed using a computer or a processor.

11. The method according to claim 10, further comprising the steps of:
storing a plurality of face images and a plurality of non-face images;
providing a second feature vector according to the face images and the non-face images; and
determining whether the face candidate region is a face region or not according to the first feature vector and the second feature vector.

12. The method according to claim 10, wherein an aspect ratio of the rectangular face feature templates is 1.2:1.

13. The method according to claim 10, wherein the rectangular face feature templates comprise:
a first rectangular face feature template, which comprises:
an upper half region; and
a lower half region, wherein a sum of gray values of the upper half region is smaller than a sum of gray values of the lower half region;
a second rectangular face feature template, which comprises:
a left half region; and
a right half region, wherein a sum of gray values of the left half region is substantially equal to a sum of gray values of the right half region; and
a third rectangular face feature template, which comprises:
an upper left region;
a lower right region, wherein the lower right region and the upper left region are skew symmetric;
an upper right region; and
a lower left region, wherein the lower left region and the upper right region are skew symmetric, and a sum of gray values of the upper left region and the lower right region is substantially equal to a sum of gray values of the upper right region and the lower left region.

14. The method according to claim 13, wherein the rectangular face feature templates comprise:
a fourth rectangular face feature template, which comprises:
an eye region; and
an under-eye region, wherein a sum of gray values of the eye region is smaller than a sum of gray values of the under-eye region; and
a fifth rectangular face feature template, which comprises:
a brow region;
a first eyebrow region; and
a second eyebrow region, wherein a sum of gray values of the brow region is greater than one half of a sum of gray values of the first eyebrow region and the second eyebrow region.

15. The method according to claim 14, wherein a width of the eye region is equal to a width of the under-eye region and equal to three fourths of a width of the fourth rectangular face feature template, and a sum of lengths of the eye region and the under-eye region is equal to one half of a length of the fourth rectangular face feature template.

16. The method according to claim 14, wherein a sum of widths of the brow region, the first eyebrow region and the second eyebrow region is equal to three fourths of a width of the fifth rectangular face feature template, and a length of the brow region is equal to a length of the first eyebrow region, equal to a length of the second eyebrow region, and equal to one fourth of a length of the fifth rectangular face feature template.

17. The method according to claim 14, wherein the rectangular face feature templates comprise:
a sixth rectangular face feature template, which comprises:
a mouth region, which comprises:
a mouth center region;
a first mouth corner region; and
a second mouth corner region, wherein a sum of gray values of the mouth center region is greater than one half of a sum of gray values of the first mouth corner region and the second mouth corner region;
a seventh rectangular face feature template, which comprises:
a mouth region, which comprises:
a mouth top region;
a mouth bottom region, wherein a sum of gray values of the mouth top region is greater than a sum of gray values of the mouth bottom region; and
a mouth middle region disposed between the mouth top region and the mouth bottom region;

an eighth rectangular face feature template, which comprises:
a mouth region, which comprises:
a mouth upper-left corner region;
a mouth lower-right corner region, wherein the mouth lower-right corner region and the mouth upper-left corner region are skew symmetric;
a mouth upper-right corner region; and
a mouth lower-left corner region, wherein the mouth lower-left corner region and the mouth upper-right corner region are skew symmetric, and a sum of gray values of the mouth upper-left corner region and the mouth lower-right corner region is substantially equal to a sum of gray values of the mouth upper-right corner region and the mouth lower-left corner region.

18. The method according to claim 10, wherein a cascade and score unit judges whether a portion of the feature values conforms to the plurality of cascade conditions or not.

* * * * *